United States Patent
Kim et al.

(10) Patent No.: US 9,116,795 B2
(45) Date of Patent: Aug. 25, 2015

(54) NON-VOLATILE MEMORY DEVICES USING A MAPPING MANAGER

(71) Applicant: Samsung Electronics Co., Ltd., Suwon-si (KR)

(72) Inventors: Jong-Hyun Kim, Suncheon-si (KR); Jung Been Im, Anyang-si (KR)

(73) Assignee: Samsung Electronics Co., Ltd. (KR)

( * ) Notice: Subject to any disclaimer, the term of this patent is extended or adjusted under 35 U.S.C. 154(b) by 204 days.

(21) Appl. No.: 13/742,528

(22) Filed: Jan. 16, 2013

(65) Prior Publication Data

US 2013/0185485 A1 Jul. 18, 2013

(30) Foreign Application Priority Data

Jan. 18, 2012 (KR) ........................ 10-2012-0005741

(51) Int. Cl.
*G06F 12/02* (2006.01)
*G06F 12/10* (2006.01)

(52) U.S. Cl.
CPC ........ *G06F 12/0246* (2013.01); *G06F 12/1009* (2013.01); *G06F 12/1027* (2013.01); *G06F 2212/7201* (2013.01); *G06F 2212/7207* (2013.01)

(58) Field of Classification Search
CPC .................. G06F 12/0246; G06F 2212/7201; G06F 2212/7207; G06F 12/1009; G06F 12/1027

See application file for complete search history.

(56) References Cited

U.S. PATENT DOCUMENTS

| 6,990,557 | B2 | 1/2006 | Hokenek et al. | |
|---|---|---|---|---|
| 7,290,112 | B2 | 10/2007 | Aguilar, Jr. et al. | |
| 7,395,404 | B2 | 7/2008 | Gorobets et al. | |
| 7,653,777 | B2 | 1/2010 | Tan et al. | |
| 2008/0098195 | A1* | 4/2008 | Cheon et al. | 711/202 |
| 2008/0155175 | A1 | 6/2008 | Sinclair et al. | |
| 2008/0189490 | A1* | 8/2008 | Cheon et al. | 711/144 |
| 2009/0070547 | A1* | 3/2009 | Jeong et al. | 711/209 |
| 2009/0193184 | A1 | 7/2009 | Yu et al. | |
| 2009/0313417 | A1 | 12/2009 | Wan | |
| 2010/0037005 | A1* | 2/2010 | Kim et al. | 711/103 |
| 2010/0125694 | A1 | 5/2010 | Choi | |
| 2011/0099325 | A1* | 4/2011 | Roh et al. | 711/103 |

(Continued)

FOREIGN PATENT DOCUMENTS

| JP | 2009-510552 | 3/2009 |
|---|---|---|
| JP | 2010-152981 | 7/2010 |
| KR | 1020030034577 | 5/2003 |

(Continued)

*Primary Examiner* — Yong Choe
*Assistant Examiner* — Glenn Gossage
(74) *Attorney, Agent, or Firm* — Myers Bigel Sibley & Sajovec, PA

(57) ABSTRACT

Storage devices herein include a non-volatile memory and a controller configured to perform a read operation on a physical page of the non-volatile memory in response to a read request on a logical page of the non-volatile memory from a host. The controller may include a mapping manager configured to manage a plurality of logical blocks by a logical unit. The mapping manager may include a unit map table including a correlation between the logical unit and a physical unit corresponding to the logical unit. Additionally, the mapping manager may be configured to change a mapping method according to whether the unit map table includes a physical unit corresponding to a logical unit including a logical page requested by the host. Related user devices and electronic devices are also provided.

20 Claims, 18 Drawing Sheets

(56) References Cited

U.S. PATENT DOCUMENTS

2011/0099326 A1* 4/2011 Jung et al. ............... 711/103
2013/0080732 A1* 3/2013 Nellans et al. ........... 711/206

FOREIGN PATENT DOCUMENTS

| KR | 1020090034135 | 4/2009 |
| KR | 1020100065702 | 6/2010 |

* cited by examiner

Fig. 7

| LUN | PUN |
|-----|-----|
| 01 | x |
| 02 | 25 |
| 03 | x |
| 04 | 02 |
| ⋮ | ⋮ |
| 25 | x |

NON-VOLATILE MEMORY DEVICES USING A MAPPING MANAGER

CROSS-REFERENCE TO RELATED APPLICATION

This U.S. non-provisional application claims priority under 35 U.S.C §119 to Korean Patent Application No. 10-2012-0005741, filed on Jan. 18, 2012, the disclosure of which is hereby incorporated by reference in its entirety.

BACKGROUND

The present disclosure relates to memory devices, and more particularly, to non-volatile memory devices.

A non-volatile memory device (e.g., a flash memory device) may use an erase-before-write operation. For example, if a write operation on a sector (e.g., 512 Bytes) of a flash memory device is requested, the write operation may be carried out after a block including the write-requested sector is erased. In contrast with a hard disk that supports a sector overwrite operation, input/output operations of the flash memory device may be relatively slow. Furthermore, a memory block of a flash memory device may become an unusable block after it experiences erase operations a relatively large number of times (e.g., over 100,000 times). Attempts have thus been made to prevent erase operations from focusing on a specific block of a flash memory device.

For example, a Flash Translation Layer (FTL) may include software that attempts to manage a flash memory device more efficiently. The FTL may receive a Logical Sector Number (LSN) from a file system and convert the LSN into a Physical Sector Number (PSN), which may be an address to be used at the flash memory device. The FTL may use an address map table for the conversion from the LSN to the PSN. The address map table may be stored in a Random Access Memory (RAM). The address map table may store information indicating a correlation between a logical address and a physical address.

Address mapping methods may include a page mapping method, a block mapping method, and a hybrid mapping method. A page mapping method may include forming a map table by the page converting a logical page into a physical page. A block mapping method may include performing a mapping operation by the block. A hybrid mapping method may use a combination of a page mapping method and a block mapping method.

A memory block may include dozens or hundreds of pages. If a page mapping method is used, a size of a map table may increase as compared with using a block mapping method. In other words, the page mapping method may require a relatively large memory space to manage a map table. If memory space is scarce/deficient, then mapping information may be loaded onto a map table from a meta area of a flash memory device, which may decrease the read performance of the flash memory device.

SUMMARY

Various embodiments of the present inventive concepts may include storage devices. The storage devices may include a flash memory configured to store data. The storage devices may also include a controller configured to perform a read operation on a physical page of the flash memory in response to a read request on a logical page of the flash memory from a host. Also, the controller may include a mapping manager configured to manage a plurality of logical blocks by a logical unit. The mapping manager may include a unit map table including a correlation between the logical unit and a physical unit corresponding to the logical unit. Additionally, the mapping manager may be configured to change a mapping method according to whether the unit map table includes a physical unit corresponding to a logical unit including a logical page requested by the host.

In various embodiments, the mapping manager may include a page map table including correlations between logical page numbers and physical page numbers, and a full block indicator configured to manage the unit map table.

According to various embodiments, when the unit map table includes the physical unit corresponding to the logical unit including the logical page requested by the host, the mapping manager may obtain a physical page corresponding to the logical page using the full block indicator.

In various embodiments, the logical unit and the physical unit corresponding to the logical unit may have the same offset on a memory block or a page.

According to various embodiments, the logical unit of the unit map table and the physical unit corresponding to the logical unit may include pages having a sequential data pattern.

In various embodiments, the logical unit of the unit map table and the physical unit corresponding to the logical unit may include pages having an erased data pattern.

According to various embodiments, when the unit map table does not include the physical unit corresponding to the logical unit including the logical page requested by the host, the mapping manager may be configured to use the page map table to obtain a physical page corresponding to the logical page.

In various embodiments, the page map table may be configured to have a correlation between the logical page and the corresponding physical page loaded onto the page map table from a meta area of the flash memory.

According to various embodiments, the controller may include a local memory configured to drive the mapping manager.

In various embodiments, the mapping manager may include a full block indicator configured to manage the unit map table. Also, the mapping manager may be configured to use the full block indicator to obtain a physical page corresponding to the logical page when the unit map table includes the physical unit corresponding to the logical unit including the logical page requested by the host.

User devices according to various embodiments may include a host. The user devices may also include a storage device configured to perform a read operation on a physical page of a flash memory in response to a read request on a logical page of the flash memory from the host. The storage device may be configured to manage a plurality of logical blocks by a logical unit, may include a unit map table that includes a correlation between the logical unit and a physical unit corresponding to the logical unit, and may be configured to change a mapping method according to whether the unit map table includes a physical unit corresponding to a logical unit including a logical page requested by the host.

In various embodiments, the storage device may include a full block indicator configured to manage the unit map table. The storage device may also include a page map table including correlations between logical page numbers and physical page numbers.

According to various embodiments, when the unit map table includes the physical unit corresponding to the logical unit including the logical page requested by the host, the storage device may be configured to use the full block indicator to obtain a physical page corresponding to the logical page.

In various embodiments, when the unit map table does not include the physical unit corresponding to the logical unit including the logical page requested by the host, the storage device may be configured to use the page map table to obtain a physical page corresponding to the logical page.

According to various embodiments, the page map table may be configured to have a correlation between the logical page and the corresponding physical page loaded onto the page map table from a meta area of the flash memory.

Electronic devices according to various embodiments may include a non-volatile memory including a data area and a meta area. The electronic devices may also include a controller configured to receive a read request for a logical page number of the data area of the non-volatile memory from a host. The electronic devices may further include a full block indicator including logical page numbers and corresponding physical page numbers. The electronic devices may additionally include a mapping manager configured to determine whether the logical page number requested by the host is included among the logical page numbers in the full block indicator. The mapping manager may also be configured to obtain a physical page number corresponding to the logical page number requested by the host in response to determining that the logical page number requested by the host is included among the logical page numbers in the full block indicator. Moreover, the mapping manager may be configured to load page number mapping information from the meta area of the non-volatile memory in response to determining that the logical page number requested by the host is not included among the logical page numbers in the full block indicator.

In various embodiments, the mapping manager may include a page map table including logical page numbers and corresponding physical page numbers. Additionally, loading page number mapping information from the meta area of the non-volatile memory may include loading the page number mapping information from the meta area onto the page map table.

According to various embodiments, determining whether the logical page number requested by the host is included among the logical page numbers in the full block indicator may include determining whether the full block indicator includes a physical unit number that corresponds to a logical unit number corresponding to the logical page number requested by the host.

In various embodiments, the non-volatile memory may include a flash memory. The flash memory may include the mapping manager. Also, the mapping manager may include the full block indicator and the page map table.

According to various embodiments, the non-volatile memory may include a flash memory. Additionally, the host may include the mapping manager.

BRIEF DESCRIPTION OF THE DRAWINGS

The above and other features and advantages of the disclosure will become more apparent in view of the attached drawings and accompanying detailed description.

FIGS. 6 to 10 are diagrams illustrating operations of a user device in FIG. 3, according to various embodiments.

FIG. 6 is a diagram illustrating a method of classifying a plurality of logical block addresses into a logical unit address.

FIG. 7 is a diagram illustrating a unit map table between logical unit numbers and physical unit numbers.

FIG. 8 is a diagram illustrating correlation between logical page numbers and physical page numbers of a unit map table in FIG. 7.

FIG. 9 is a diagram illustrating an example of an FBI mapping method of a user device illustrated in FIG. 3 in which a physical unit number of a logical unit number exists.

FIG. 10 is a diagram illustrating an example in which no physical unit number of a logical unit number exists.

FIG. 13 is a block diagram schematically illustrating a memory card system to which a user device according to various embodiments of the present inventive concepts may be applied.

FIG. 14 is a block diagram illustrating a solid state drive (SSD) system including a user device according to various embodiments of the present inventive concepts.

FIG. 15 is a block diagram schematically illustrating an SSD controller in FIG. 14.

FIG. 16 is a block diagram schematically illustrating an electronic device including a user device according to various embodiments of the present inventive concepts.

FIG. 17 is a block diagram schematically illustrating a flash memory according to various embodiments.

FIG. 18 is a perspective view schematically illustrating a 3D structure of a memory block illustrated in FIG. 17.

FIG. 19 is a circuit diagram schematically illustrating an equivalent circuit of a memory block illustrated in FIG. 18.

DETAILED DESCRIPTION

Figure 1:
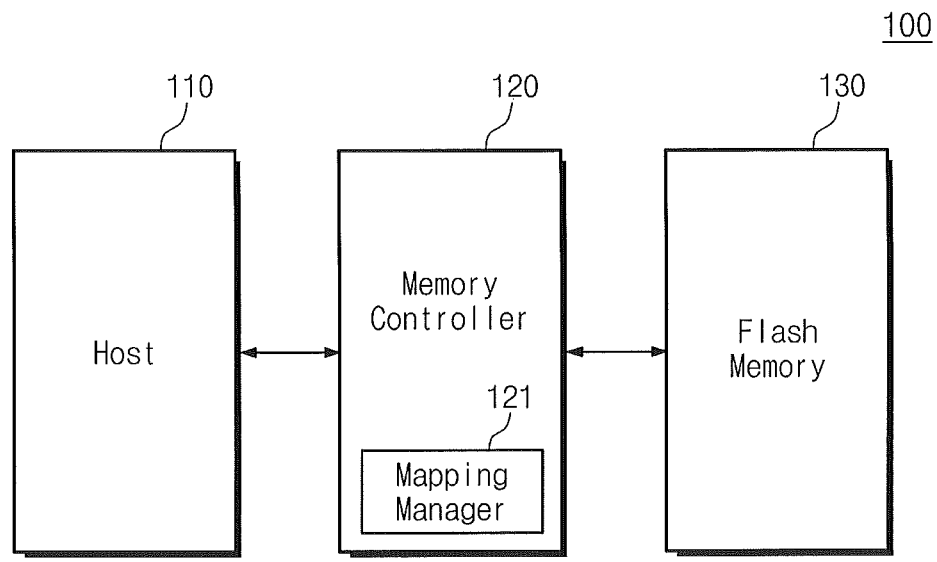
FIG. 1 is a block diagram schematically illustrating the hardware architecture of a flash memory-based user device, according to various embodiments of the inventive concepts.

Example embodiments are described below with reference to the accompanying drawings. Many different forms and embodiments are possible without deviating from the spirit and teachings of this disclosure and so the disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of layers and regions may be exaggerated for clarity. Like reference numbers refer to like elements throughout.

The terminology used herein is for the purpose of describing particular embodiments only and is not intended to be limiting of the embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of the stated features, steps, operations, elements, and/or components, but do not preclude the presence or addition of one or more other features, steps, operations, elements, components, and/or groups thereof.

It will be understood that when an element is referred to as being "coupled," "connected," or "responsive" to, or "on," another element, it can be directly coupled, connected, or responsive to, or on, the other element, or intervening elements may also be present. In contrast, when an element is referred to as being "directly coupled," "directly connected," or "directly responsive" to, or "directly on," another element, there are no intervening elements present. As used herein the term "and/or" includes any and all combinations of one or more of the associated listed items.

It will be understood that although the terms "first," "second," etc. may be used herein to describe various elements, these elements should not be limited by these terms. These terms are only used to distinguish one element from another. Thus, a "first" element could be termed a "second" element without departing from the teachings of the present embodiments.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein may be interpreted accordingly.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram schematically illustrating the hardware architecture of a flash memory-based user device according to various embodiments of the present inventive concepts. Moreover, FIG. 2 is a diagram illustrating the software architecture of a user device in FIG. 1, according to various embodiments.

Referring to FIG. 1, a hardware-structured user device 100 may include a host 110, a memory controller 120, and a non-volatile memory 130 (e.g., a flash memory 130). Herein, elements of the user device 100 may be formed of separate chips, modules, or devices. Elements of the user device 100 can be formed within a device. Further, the memory controller 120 and the flash memory 130 may be implemented by a device to be connected to the host 110. As illustrated in FIG. 2, a software architecture 200 of the user device 100 may include an application 205, a file system 210, a Flash Translation Layer (FTL) 220, and a flash memory 230.

Figure 2:
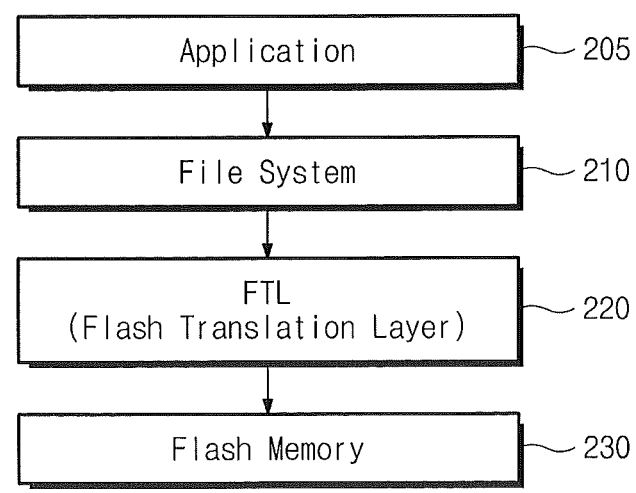
FIG. 2 is a diagram illustrating the software architecture of a user device in FIG. 1, according to various embodiments.

Referring to FIGS. 1 and 2, the host 110 may request reading or writing of the memory controller 120 using the application 205 and/or the file system 210. The memory controller 120 may control operations (e.g., reading, writing, etc.) of the flash memory 130 in response to a request of the host 110.

The flash memory 130 may include a plurality of memory cells that are arranged to have a string cell structure. A group of memory cells may be referred to as a memory cell array. A memory cell array of the flash memory 130 may be formed of a plurality of memory blocks, each of which may have a plurality of pages. Each page may be formed of memory cells sharing a word line.

Reading/writing operations of the flash memory 130 and erasing operations of the flash memory 130 may be performed by different units (e.g., page vs. block). For example, the flash memory 130 may perform a read operation and a write operation by the page and an erase operation by the memory block. Unlike other semiconductor memory devices, the flash memory 130 may not support an overwrite operation. Thus, the flash memory 130 may perform an erase operation before performing a write operation.

Due to the above-described characteristics, the flash memory 130 may necessitate managing a read operation or a write operation separately to enable the flash memory 130 to be used like a hard disk. The memory controller 120 may include a flash translation layer including software for managing an operation of the flash memory 130 in response to a command of the host 110.

In FIG. 1, a mapping manager 121 may include the flash translation layer (e.g., the FTL 220 of FIG. 2), and may convert a logical address from (e.g., requested by) the host 110 into a physical address using the flash translation layer.

The mapping manager 121 may perform an address mapping operation using various methods. For example, the mapping manger 121 may execute a page mapping method, in which a mapping operation is performed by the page, a block mapping method, in which a mapping operation is carried out by the block, and a hybrid mapping method using both the page mapping method and the block mapping method.

The page mapping method may include the advantages of relatively simple mapping and relatively good application of free space. However, the page mapping method may necessitate a relatively large memory space to manage a page map table. A memory space may be reduced via the block mapping method. However, the block mapping method may accompany many merge operations. With the hybrid mapping method, the page mapping method may be used to manage a log block. Since the hybrid mapping method uses both of the page and block mapping methods, using the hybrid mapping method may reduce a size of a map table and the number of merge operations.

The mapping manager 121 may use one of the above-described mapping methods or a combination of at least two of the above-described mapping methods. Further, the mapping manager 121 may use the block mapping method to reduce a size of a map table. Under a specific condition, the mapping manager 121 may use a modified type of mapping method that may enable a read operation on the flash memory 130 to be performed relatively rapidly. Hereinafter, the modified type of mapping method may be referred to as a Full Block Indicator (FBI) mapping method.

Figure 3:
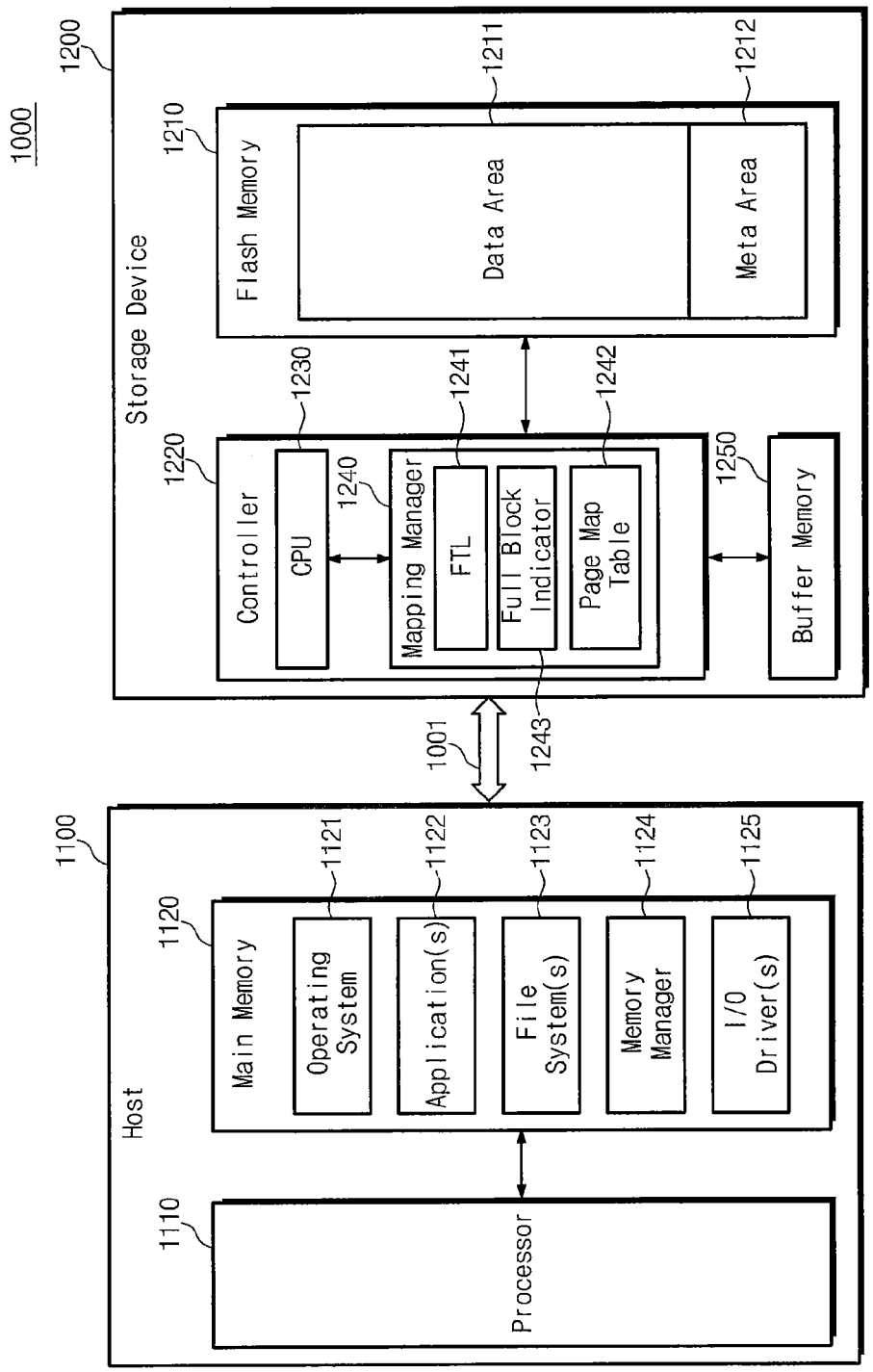
FIG. 3 is a block diagram illustrating a Full Block Indicator (FBI) mapping operation of a user device or a storage device, according to various embodiments.

FIG. 3 is a block diagram illustrating an FBI mapping method of a user device or a storage device, according to various embodiments. Referring to FIG. 3, a user device 1000 may include a host 1100 and a storage device 1200. The host 1100 and the storage device 1200 may be connected via an interface 1001. The interface 1001 may include a standardized interface such as AT Attachment (ATA), Serial AT Attachment (SATA), Parallel AT Attachment (PATA), Universal Serial Bus (USB), Small Computer System Interface (SCSI), Enhanced Small Disk Interface (ESDI), Institute of Electrical and Electronics Engineers (IEEE) 1394, Integrated Drive Electronics (IDE), and/or a card interface, among others.

The host 1100 may include a processor 1110 and a main memory 1120. The processor 1110 and the main memory 1120 may be connected via an address/data bus. The host 1100 may be a Personal Digital Assistant (PDA), a computer (desktop, laptop, netbook, tablet, etc.), a digital audio player, a digital camera, a mobile phone, and the like. The main memory 1120 may be a non-volatile or volatile memory such as a cache, a Read Only Memory (ROM), a Programmable Read Only Memory (PROM), an Erasable Programmable Read Only Memory (EPROM), an Electrically Erasable Programmable Read Only Memory (EEPROM), a flash memory, a Static Random Access Memory (SRAM), a Dynamic Random Access Memory (DRAM), and the like.

Referring to FIG. 3, the main memory 1120 may drive a plurality of software or firmware units or applications. In example embodiments, the main memory 1120 may include an operating system 1121, an application (or applications) 1122, a file system (or file systems) 1123, a memory manager 1124, and an input/output (I/O) driver (or drivers) 1125. Although a main memory 1120 may be illustrated in FIG. 3, it will be understood that the host 1100 may be configured to include more (e.g., two, three, or more) main memories.

The operating system 1121 may control a software and/or hardware resource of the host 1100, and may control program execution by the processor 1110. The application(s) 1122 may indicate various application programs being executed at the host 1100.

The file system(s) 1123 may organize a file or data stored in a storage region such as the memory 1120 or the storage device 1200. The file system(s) 1123 may provide the storage device 1200 with address information according to a write or read command. The file system(s) 1123 may be used according to the specific operating system 1121 being executed at the host 1100. The file system(s) 1123 can be included within the operating system 1121.

The memory manager 1124 may control a memory access operation being executed at the main memory 1120 and/or a memory access operation being executed at an external device such as the storage device 1200. The input/output driver(s) 1125 may transfer information among the host 1100 and another device such as the storage device 1200, a computer system, or a network (e.g., the Internet or a local network such as a wireless local area network (WLAN)).

Referring still to FIG. 3, the storage device 1200 may be a data storage device that includes (e.g., is based on) a flash memory 1210. In various embodiments, the storage device 1200 may include a flash memory 1210, a controller 1220, and a buffer memory 1250. The storage device 1200 may be a memory card device, a SSD (Solid State Drive) device, an ATA bus device, a SATA bus device, a multimedia card device, an SD (Secure Digital) device, a memory stick device, a hybrid drive device, or a USB flash device, among others.

The flash memory 1210 may be connected to the controller 1220 via an address bus or a data bus. The flash memory 1210 may be divided into a data area 1211 and a meta area 1212. User data or main data may be stored in the data area 1211, and metadata (e.g., mapping information managed by an FTL) needed to drive the flash memory 1210 or the storage device 1200 other than the user data may be stored in the meta area 1212.

The controller 1220 may exchange data with the flash memory 1210 or the buffer memory 1250 via an address/data bus. The controller 1220 may include a CPU (Central Processing Unit) 1230 and a local memory 1240. The local memory 1240 may include a cache, a ROM, a PROM, an EPROM, an EEPROM, a flash memory, an SRAM, or a DRAM. The local memory 1240 may include, and/or may be used to drive, a mapping manager. The mapping manager may include a flash translation layer (FTL) 1241, a page map table 1242, and a full block indicator 1243.

The buffer memory 1250 may be used to temporarily store data to be stored in the flash memory 1210 or data read out from the flash memory 1210. The buffer memory 1250 can be used to drive the page map table 1242 or the full block indicator 1243. The buffer memory 1250 may include a volatile memory or a nonvolatile memory.

Referring still to FIG. 3, the flash translation layer (FTL) 1241 may be used to more efficiently use the flash memory 1210. The FTL 1241 may translate logical addresses provided from the host 1100 into physical addresses for the flash memory 1210.

The FTL 1241 may manage address conversion via a map table. The map table may store correlation(s) between logical addresses and physical addresses. A size of the map table may vary according to a mapping unit (e.g., block vs. page). Various mapping methods may be used according to a mapping unit.

The page map table 1242 may configure a map table by the page, and may convert logical page numbers into physical page numbers. In general, a memory cell array may include numerous memory blocks, each of which includes dozens or hundreds of pages. If a page mapping method is used, a size of a map table may increase as compared with using a block mapping method. In other words, the page mapping method may require a large memory space to manage a map table.

If a memory space is sufficient to drive the page map table 1242, the mapping manager may store all page mapping information at/in the local memory 1240, and may perform a mapping operation without an additional operation. If a memory space is insufficient to drive the page map table 1242, however, mapping information may be stored at the meta area 1212 of the flash memory 1210. Mapping information may be loaded onto the page map table 1242 as appropriate/necessary.

Figure 4:
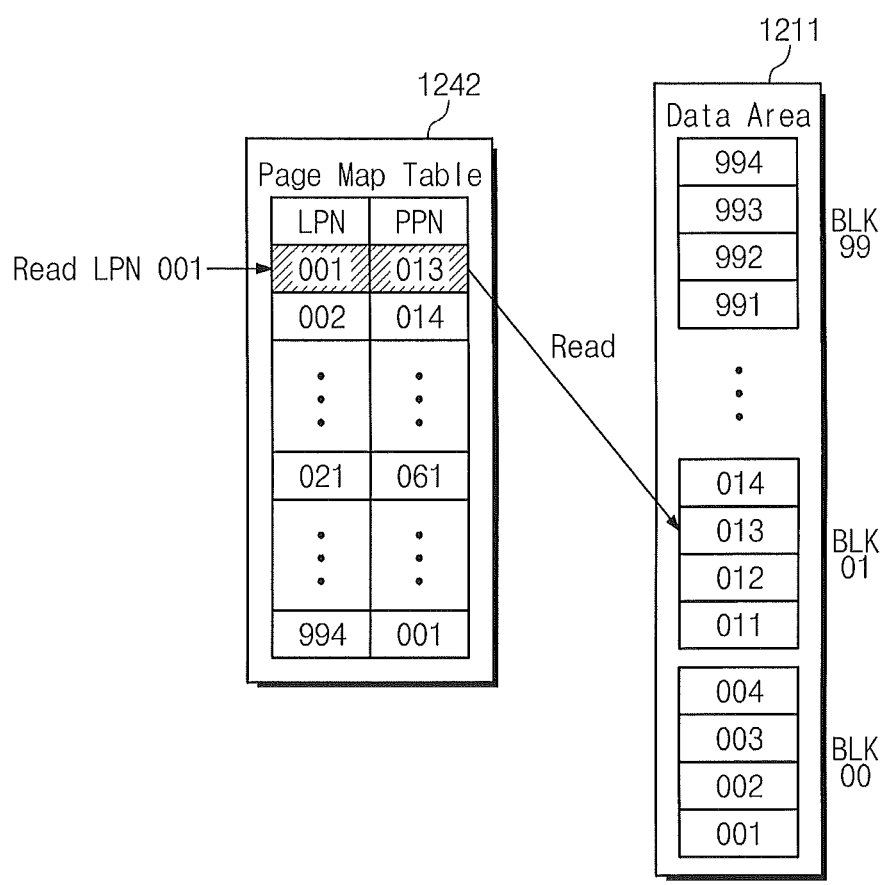
FIGS. 4 and 5 are diagrams illustrating a page mapping operation of a user device in FIG. 3, according to various embodiments.
Figure 5:
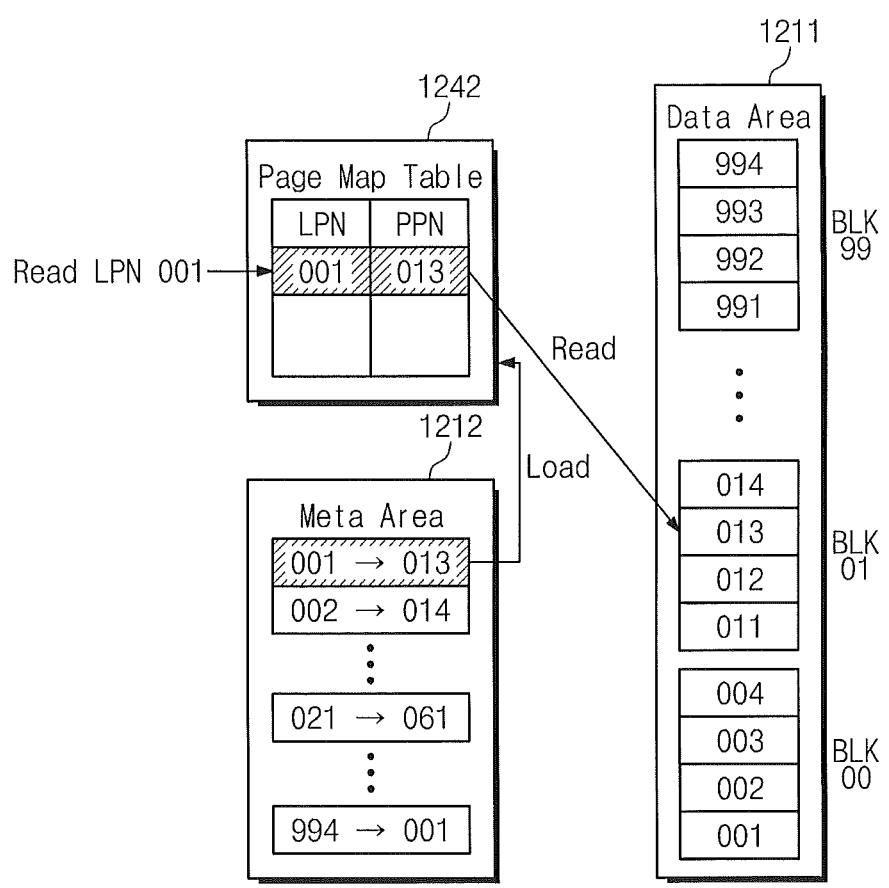

FIGS. 4 and 5 are diagrams illustrating a page mapping method of a user device in FIG. 3, according to various embodiments. FIG. 4 illustrates an example of a page mapping method executed when a memory space is sufficient to drive a page map table 1242. FIG. 5 illustrates an example of a page mapping method executed when a memory space is insufficient to drive a page map table 1242. For ease of description, it may be assumed that a data area 1211 of a flash memory 1210 (e.g., as illustrated in FIG. 3) includes one hundred (100) memory blocks, each having four pages.

Referring to FIG. 4, the data area 1211 of the flash memory 1210 may include 100 memory blocks BLK00 to BLK99. Each memory block may include four pages. For example, a memory block BLK00 may include four physical pages indicated as pages 001 to 004, and a memory block BLK99 may include four physical pages indicated as pages 991 to 994.

A page map table 1242 may include mapping information associated with correlation between logical page numbers (LPN) and physical page numbers (PPN). For example, a logical page number of 001 may correspond to a physical page number of 013, a logical page number of 002 may correspond to a physical page number of 014, a logical page number of 021 may correspond to a physical page number of 061, and a logical page number of 994 may correspond to a physical page number of 001. If a read operation on/for a logical page number of 001 is requested by a host 1100 (refer to FIG. 3), a mapping manager may obtain a physical page number of 013 corresponding to the logical page number of 001 from the page map table 1242. A storage device 1200 (refer to FIG. 3) may actually perform a read operation on the physical page number of 013 of a memory block BLK01.

The page mapping method in FIG. 4 may be used when a memory space of a local memory 1240 (refer to FIG. 3) is sufficient to drive a page map table 1242. If a memory space of the local memory 1240 is insufficient to drive the page map table 1242, as illustrated in FIG. 5, mapping information may be loaded onto the page map table 1242 from a meta area 1212 of a flash memory 1210, and then a read operation may be carried out.

Referring to FIG. 5, the mapping manger may load page mapping information stored in the meta area 1212 onto the page map table 1242, and may perform a read operation on/for a logical page number of 001. For example, if a read operation on/for a logical page number of 001 is requested by the host 1100, information associated with page mapping between a logical page number of 001 and a physical page number of 013 may be loaded onto the page map table 1242 from the meta area 1212. After loading the page mapping information, a read operation on a physical page number of 013 in a memory block BLK01 may be executed.

Returning to FIG. 3, the mapping manager driven on a local memory 1240 may further include a Full Block Indicator (FBI) 1243. The full block indicator 1243 may be a type of map table that records mapping information made by dividing location information of data by a logical unit.

The storage device 1200 (or another component of the user device 1000) may perform a page mapping operation using the full block indicator 1243 without loading page mapping information from the meta area 1212 under a specific condition when a memory space of the page map table 1242 is insufficient. Accordingly, it may be possible to improve (i.e., increase) the read performance of the user device by using an FBI mapping method.

Figure 6:
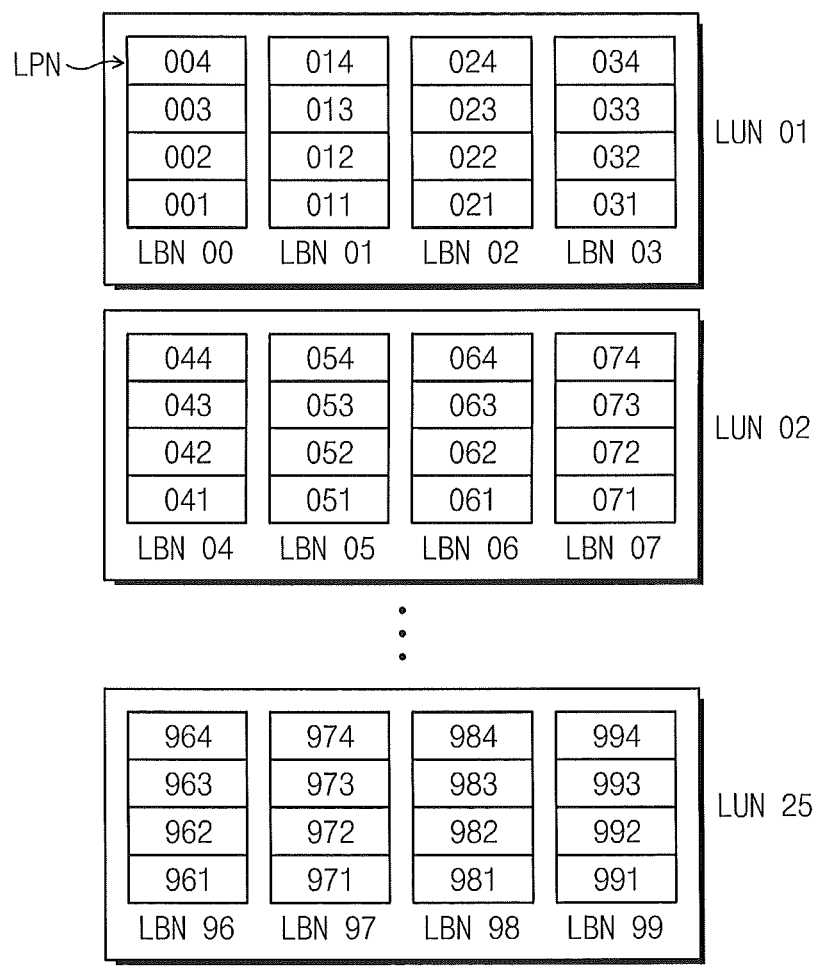

FIGS. 6 to 10 are diagrams illustrating an FBI mapping method of a user device illustrated in FIG. 3. FIG. 6 is a diagram illustrating a method of classifying a plurality of logical block addresses into a logical unit address.

Referring to FIG. 6, one logical unit may include four logical blocks. Each logical block may have four logical pages. It will be understood, however, that the number of logical blocks included in a logical unit may vary. For example, a logical unit may include more or fewer than four logical blocks. Further, it may be possible to configure logical units such that the number of logical blocks is different from one logical unit to another.

Referring to FIG. 6, a logical unit number LUN 01 may include logical blocks respectively marked by logical block numbers LBN 00 to LBN 03. The logical block number LBN 00 may include four logical pages respectively marked by logical page numbers LPN 001 to LPN 004. A logical unit number LUN 02 may include logical blocks respectively marked by logical block numbers LBN 04 to LBN 07. Likewise, a logical unit number LUN 25 may include logical blocks respectively marked by logical block numbers LBN 96 to LBN 99. Each logical block may include four logical pages.

Figure 7:
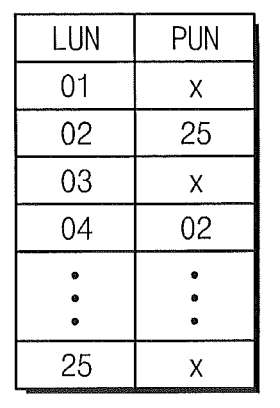

FIG. 7 is a diagram illustrating a unit map table between logical unit numbers and physical unit numbers (PUNs). A physical unit may have the same size as a logical unit. If a logical unit includes four logical blocks, a physical unit may have four physical blocks.

Referring to FIG. 7, no physical unit number corresponding to a logical unit number LUN 01 may exist. A physical unit number corresponding to a logical unit number LUN 02 may be PUN 25. Likewise, no physical unit number corresponding to each of logical unit numbers LUN 03 and LUN 25 may exist. A physical unit number corresponding to a logical unit number LUN 04 may be PUN 02.

Figure 8:
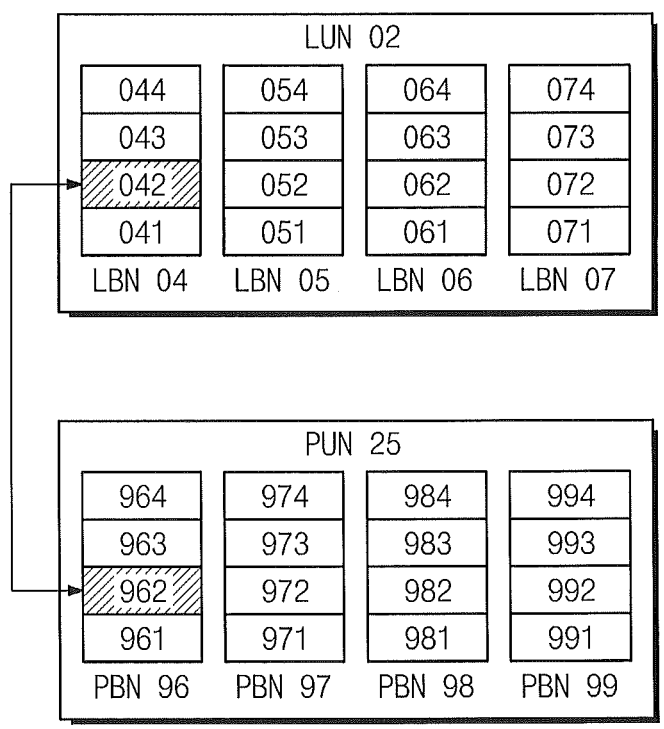

FIG. 8 is a diagram illustrating a correlation between a logical page number and a physical page number of a unit map table in FIG. 7. Referring to FIG. 8, a logical unit number LUN 02 may include logical block numbers LBN 04 to LBN 07. The logical block number LBN 04 may include logical page numbers LPN 041 to LPN 044.

A physical unit number corresponding to a logical unit number LUN 02 may be PUN 25. The physical unit number PUN 25 may include physical block numbers PBN 96 to PBN99. The physical block number PBN 96 may include physical page numbers PPN 961 to PPN 964.

In FIG. 8, the same offset (e.g., position) may be generated between a logical block number and a physical block number and between a logical page number and a physical page number. For example, a logical block number LBN 04 of a logical unit number LUN 02 may correspond to a physical block number PBN 96 of a physical unit number PUN 25 at the same position. Moreover, a logical page number LPN 042 of the logical block number LBN 04 may correspond to a physical page number PPN 962 of the physical block number PBN 96 at the same position. Accordingly, a page mapping operation may be executed without loading mapping information from a meta area 1212.

Figure 9:
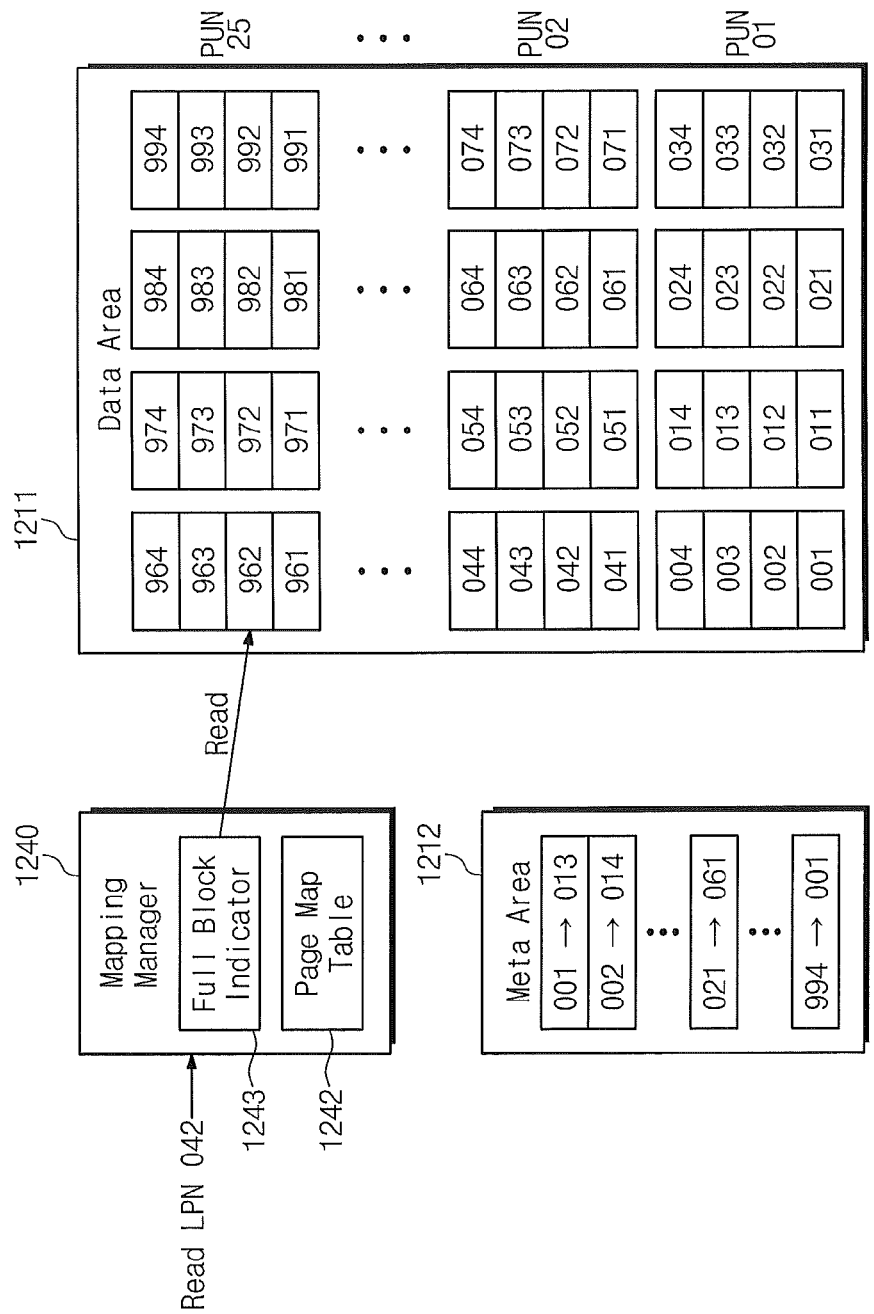
Figure 10:
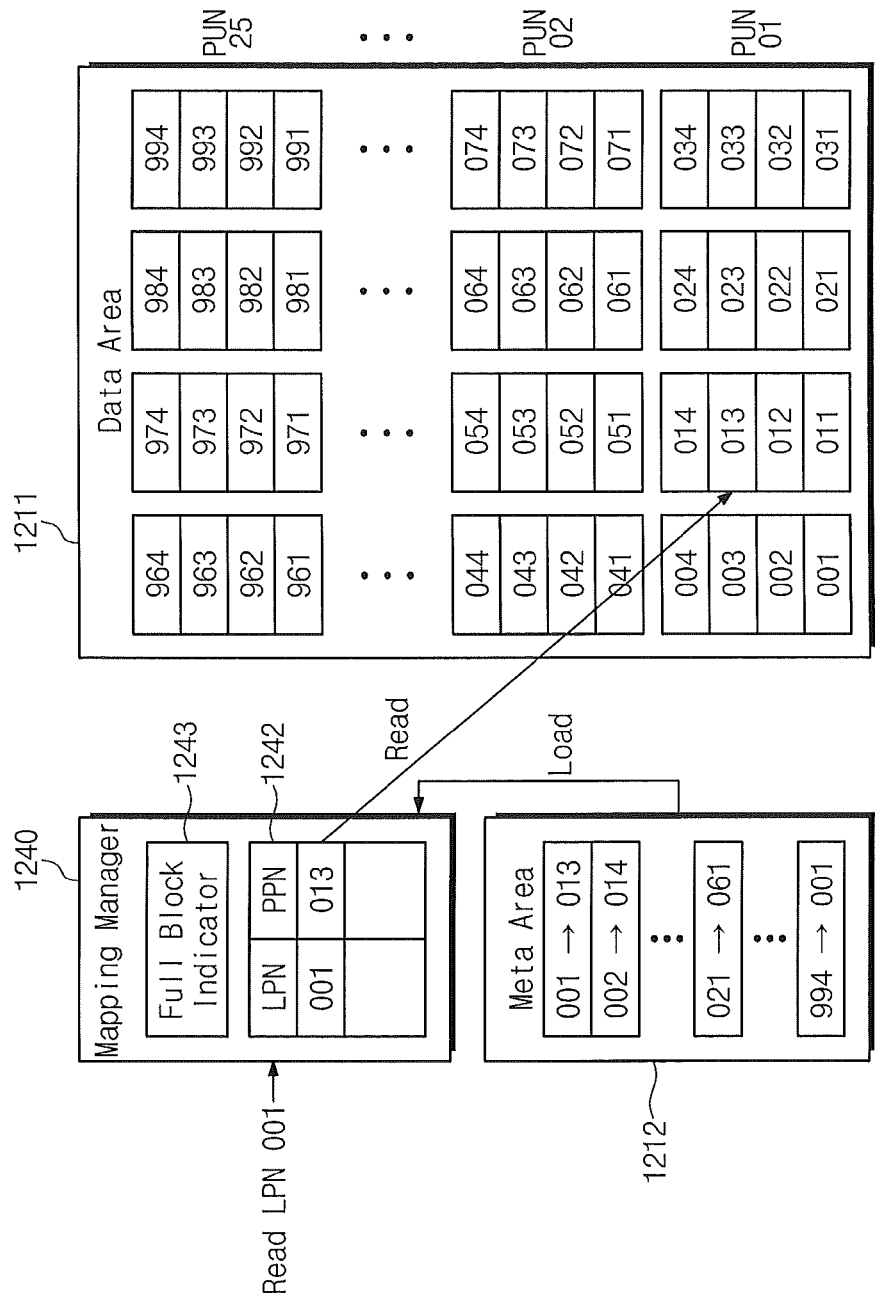

FIGS. 9 and 10 are diagrams illustrating an FBI mapping method of a user device illustrated in FIG. 3, according to various embodiments. FIG. 9 is a diagram illustrating an example in which a physical unit number of a logical unit number exists.

Referring to FIG. 9, a mapping manager of a local memory 1240 may receive a read request on/for a logical page number LPN 042 from a host 1100. The mapping manager may search for a logical unit number corresponding to LPN 042 at a full block indicator 1243, and may search for a physical unit number corresponding to the searched logical unit number at the full block indicator 1243. Returning to FIG. 6, the logical page number LPN 042 may belong to a logical block number LBN 04, and the LBN 04 may belong to a logical unit number LUN 02. Referring to a unit map table illustrated in FIG. 7, a physical unit number corresponding to the logical unit number LUN 02 may be PUN 25. The mapping manager may obtain a physical page number PPN 962 corresponding to the logical page number 042, as described in FIG. 8.

With the FBI mapping method illustrated in FIG. 9, a page mapping operation may be relatively simply executed using the full block indicator 1243 without loading mapping information from a meta area. The FBI mapping method in FIG. 9 may be used, for example, when a logical unit of a unit map table and a corresponding physical unit have the same offset with respect to a memory block or a page.

The FBI mapping method in FIG. 9 may be used relatively efficiently when a logical unit of a unit map table and a corresponding physical unit include pages having a sequential data pattern or an erased data pattern. Herein, the sequential data pattern may mean that user data in a logical unit or a physical unit is associated. For example, if an image or a moving picture is programmed at a plurality of memory blocks, the plurality of memory blocks may constitute a logical unit or a physical unit. The erased data pattern may mean a state in which a plurality of memory blocks are not yet programmed. That is, in an example in which a plurality of memory blocks remain at an erase state, the plurality of memory blocks may constitute a logical unit or a physical unit.

The mapping manager according to various embodiments may manage a plurality of memory blocks having a sequential data pattern or an erased data pattern as a memory unit, and may have a unit map table including a correlation between a logical unit and a physical unit. The mapping manager may change a mapping manner according to whether a map table includes a physical unit corresponding to a logical unit including a logical page from a host.

If a map table includes a physical unit corresponding to a logical unit including a logical page from (e.g., requested by) a host, the mapping manager may obtain a physical page corresponding to a logical page using the full block indicator 1243, and may perform a read operation on the physical page. Accordingly, it may be possible to perform a page mapping operation relatively simply using the full block indicator 1243 without loading mapping information from a meta area.

FIG. 10 is a diagram illustrating an example in which no physical unit number of a logical unit number exists. Referring to FIG. 10, a mapping manager of a local memory 1240 may receive a read request on/for a logical page number LPN 001 from a host 1100. The mapping manager may search (e.g., search for) a logical unit number corresponding to the logical page number LPN 001.

Returning to FIG. 6, a logical page number LPN 001 may correspond to a logical block number LBN 00, which belongs to a logical unit number LUN 01. Referring to a unit map table illustrated in FIG. 7, no physical unit number of the logical unit number LUN 01 exists. Accordingly, the mapping manager, as illustrated in FIG. 10, may load corresponding mapping information onto a page map table 1242 from a meta area 1212, and may perform a read operation on a corresponding physical page number PPN 013.

Figure 11:
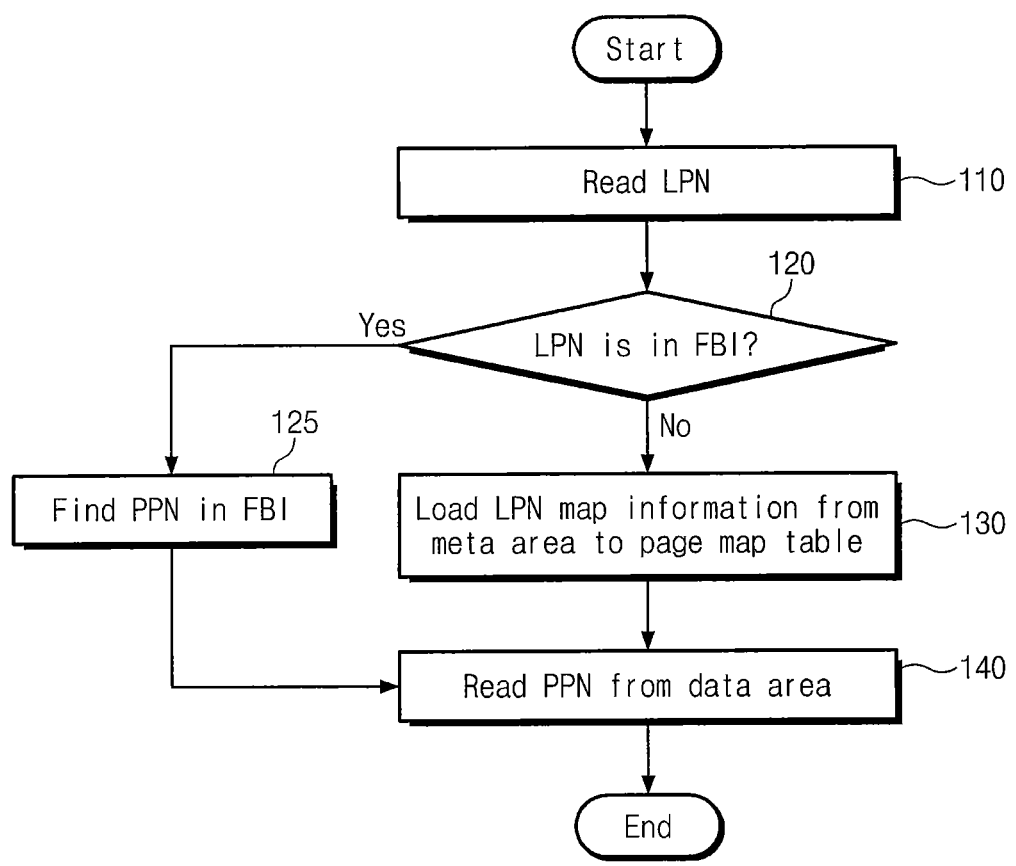
FIG. 11 is a flowchart illustrating a data read operation of a storage device in FIG. 3, according to various embodiments.

FIG. 11 is a flowchart describing data read operations of a storage device in FIG. 3, according to various embodiments. A read operation may be carried out using an FBI mapping method of a mapping manager illustrated in FIG. 3. The mapping manager may include a page map table 1242 and/or a full block indicator 1243.

In Block 110, a host 1100 may request a read operation on/for a logical page number to a storage device 1200. In Block 120, a mapping manager of the storage device 1200 may determine whether the full block indicator 1243 includes the logical page number input from the host 1100. That is, the mapping manager may search a logical unit number LUN corresponding to the logical page number LPN, and may determine whether the full block indicator 1243 includes a physical unit number PUN corresponding to the searched LUN.

If the full block indicator 1243 includes the logical page number LPN, then the mapping manager may obtain/find (Block 125) a corresponding physical page number PPN. If the full block indicator 1243 does not include the logical page number LPN, then LPN mapping information may be loaded (Block 130) onto the page map table 1242 from a meta area 1212. In Block 140, data may be read out from the physical page number PPN of a data area 1211. The read data may be provided to the host 1100.

The data read operations of a storage device described herein may include receiving a read request on (e.g., for) a logical page of a flash memory from a host. The mapping manager may be changed according to whether a unit map table includes a physical unit corresponding to a logical unit. If the unit map table includes a physical unit corresponding to a logical unit, a physical page corresponding to a logical page may be obtained using a full block indicator, and a read operation on a corresponding page may be carried out. Accordingly, it may be possible to perform a page mapping operation relatively simply using the full block indicator without loading mapping information from a meta area.

Figure 12:
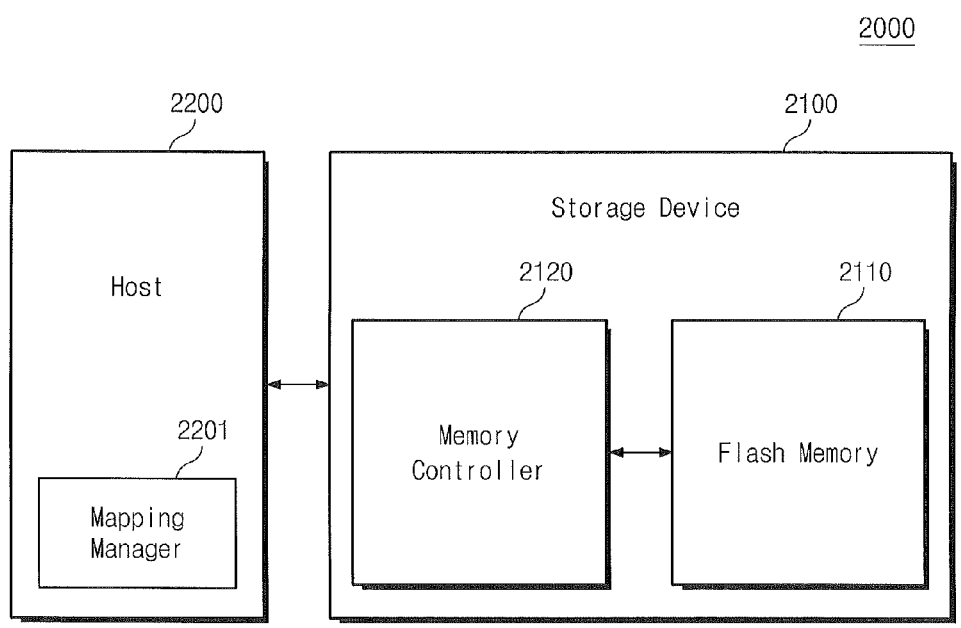
FIG. 12 is a block diagram schematically illustrating a user device in which a host includes a mapping manager illustrated in FIG. 3, according to various embodiments.

FIG. 12 is a block diagram schematically illustrating a user device in which a host includes a mapping manager illustrated in FIG. 3, according to various embodiments. Referring to FIG. 12, a user device 2000 may include a storage device 2100 and a host 2200. The storage device 2100 may include a flash memory 2110 and a memory controller 2120.

The storage device 2100 may include a non-transitory storage medium such as a memory card (e.g., SD, MultiMediaCard (MMC), etc.) or an attachable handheld storage device (e.g., a USB memory). The storage device 2100 may be connected with the host 2200. The storage device 2100 may transmit and receive data to and from the host 2200 via a host interface. The storage device 2100 may be supplied with power from the host 2200.

Referring to FIG. 12, a mapping manager 2201 may be included in the host 2200. In an example in which a unit map table includes a physical unit corresponding to a logical unit, the user device 2000 in FIG. 12 may obtain a physical page number corresponding to a logical page number using a full block indicator 1243 (refer to FIG. 3), and may perform a read operation on a corresponding page.

Accordingly, it may possible to perform a page mapping operation relatively simply using the full block indicator 1243 without loading mapping information from a meta area. Thus, the user device 2000 may improve the read performance using the mapping manager.

FIGS. 13 to 16 illustrate block diagrams of applications of a flash memory-based user device, according to various embodiments.

Figure 13:
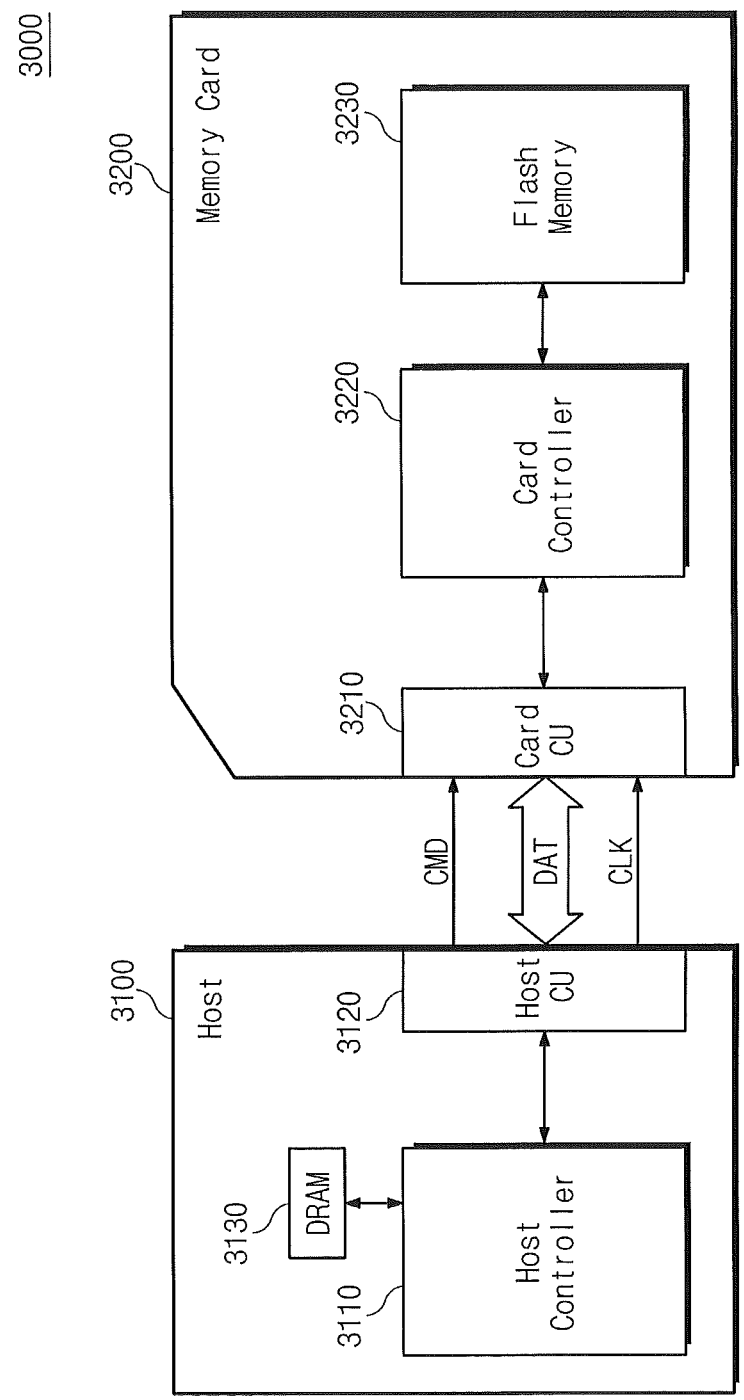
FIGS. 13 to 16 illustrate block diagrams of applications of a flash memory-based user device, according to various embodiments.

FIG. 13 is a block diagram schematically illustrating a memory card system to which a user device according to various embodiments of the present inventive concepts may be applied. A memory card system 3000 may include a host 3100 and a memory card 3200. The host 3100 may include a host controller 3110, a host connection unit 3120, and a DRAM 3130. The memory card 3200 may include a card connection unit 3210, a card controller 3220, and a flash memory 3230. The host controller 3110 or the card controller 3220 may include the mapping manager described herein.

The host 3100 may write data in the memory card 3200 and read data from the memory card 3200. The host controller 3110 may send a command (e.g., a write command), a clock signal CLK generated from a clock generator in the host 3100, and data to the memory card 3200 via the host connection unit 3120.

The card controller 3220 may store data in the flash memory 3230 in response to a command input via the card connection unit 3210. The data may be stored in synchronization with a clock signal generated from a clock generator in the card controller 3220. The flash memory 3230 may store data transferred from the host 3100. For example, in an example in which the host 3100 is a digital camera, the flash memory 3230 may store image data.

The memory card 3200 in FIG. 13 may improve the read performance of the flash memory 3230 using a mapping manager. That is, in a case where a unit map table includes a physical unit corresponding to a logical unit, the memory card 3200 in FIG. 13 may obtain a physical page number corresponding to a logical page number using a full block indicator 1243 (refer to FIG. 3), and may perform a read operation on a corresponding page.

Accordingly, it may be possible to perform a page mapping operation relatively simply using the full block indicator 1243 without loading mapping information from a meta area 1212 (refer to FIG. 3). Thus, the memory card 3200 may improve the read performance using the mapping manager.

Figure 14:
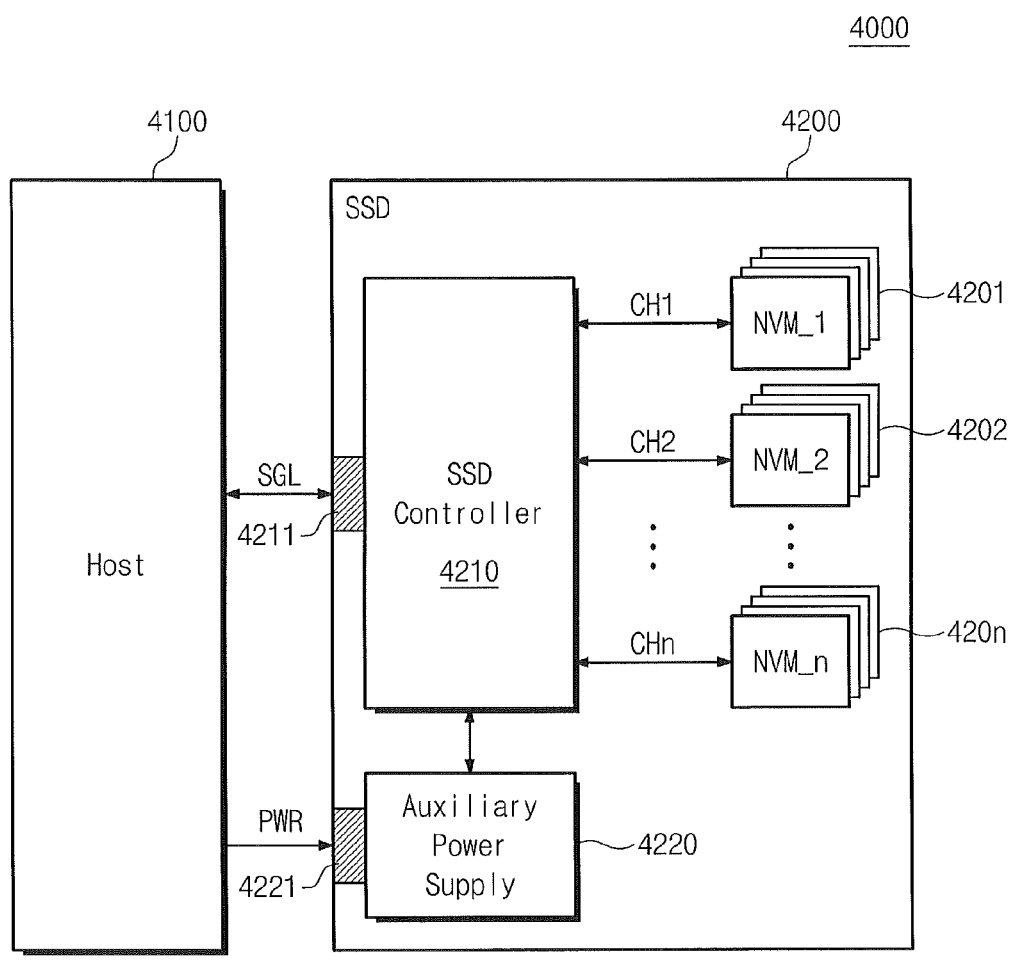

FIG. 14 is a block diagram illustrating a solid state drive system including a user device according to various embodiments of the present inventive concepts. Referring to FIG. 14, a solid state drive (SSD) system 4000 may include a host 4100 and an SSD 4200.

The SSD 4200 may exchange signals SGL with the host 4100 via the host interface 4211 and may be supplied with power via a power connector 4221. The SSD 4200 may include a plurality of Non-Volatile Memories (NVMs) 4201 to 420n, an SSD controller 4210, and an auxiliary power supply 4220. The host 4100 or the SSD controller 4210 may include the mapping manager described herein.

The plurality of non-volatile memories 4201 to 420n may be used as a storage medium of the SSD 4200. The plurality of non-volatile memories 4201 to 420n may utilize non-volatile memory devices such as Phase-Change Random Access Memory (PRAM), Magneto-resistive Random Access Memory (MRAM), Resistive Random Access Memory (ReRAM), Ferroelectric Random Access Memory (FRAM), and the like, as well as flash memory. The plurality of nonvolatile memories 4201 to 420n may be connected with the SSD controller 4210 via a plurality of channels CH1 to CHn. Each channel may be connected with one or more non-volatile memories (e.g., the non-volatile memories 4201 to 420n). Non-volatile memories (e.g., the non-volatile memories 4201 to 420n) connected with one (e.g., the same) channel may be connected via the same data bus.

The SSD controller 4210 may exchange signals SGL with the host 4100 via the host interface 4211. Herein, the signals SGL may include a command, an address, data, and the like. The SSD controller 4210 may be configured to write or read out data to or from a corresponding non-volatile memory according to a command of the host 4100.

The auxiliary power supply 4220 may be connected with the host 4100 via the power connector 4221. The auxiliary power supply 4220 may be charged by power PWR from the host 4100. The auxiliary power supply 4220 may be within (e.g., internal to) the SSD 4200 or outside (e.g., external to) the SSD 4200. For example, the auxiliary power supply 4220 may be on a main board to supply an auxiliary power to the SSD 4200.

Figure 15:
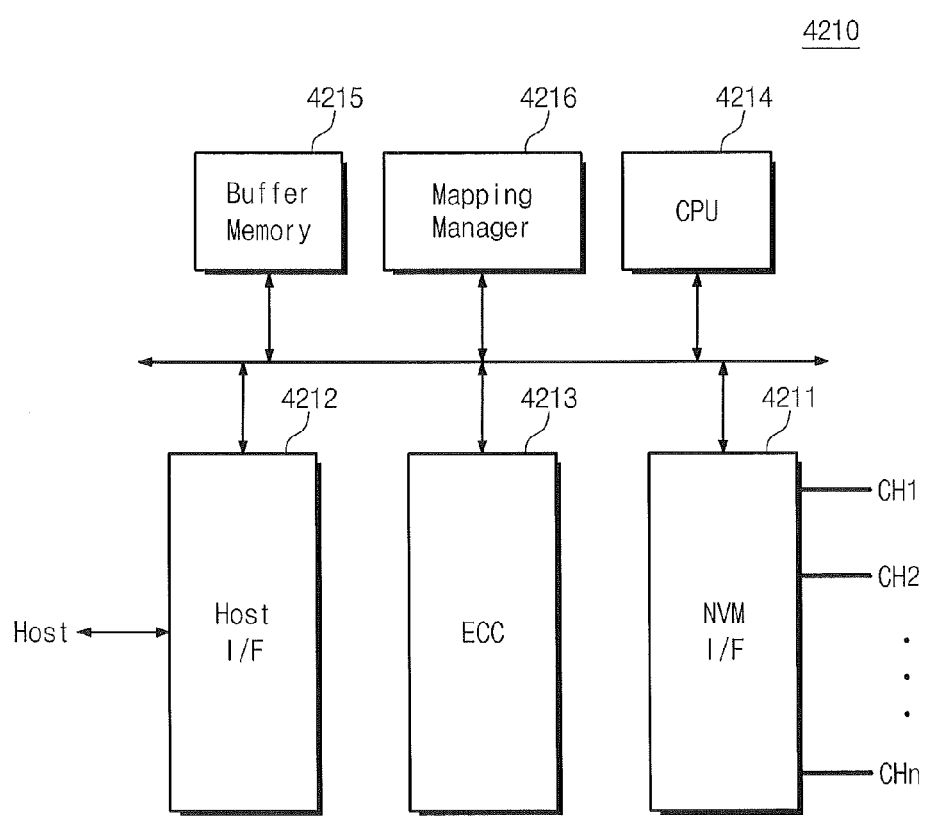

FIG. 15 is a block diagram schematically illustrating an SSD controller in FIG. 14. Referring to FIG. 15, an SSD controller 4210 may include a Non-Volatile Memory (NVM) interface (I/F) 4211, a host interface (I/F) 4212, an Error-Correcting Code (ECC) circuit 4213, a CPU 4214, a buffer memory 4215, and a mapping manager 4216.

The NVM interface 4211 may distribute data transferred from a main memory of a host 4100 (e.g., the host 4100 in FIG. 14) to channels CH1 to CHn, respectively. The NVM interface 4211 may transfer data read from non-volatile memories 4201 to 420n to the buffer memory 4215. Herein, the NVM interface 4211 may use an interface manner of a flash memory. That is, the SSD controller 4210 may perform reading, programming, or erasing operations according to a flash memory interface manner.

The host interface 4212 may provide an interface with an SSD 4200 (e.g., the SSD 4200 in FIG.14) according to the protocol of the host 4100. The host interface 4212 may communicate with the host 4100 using Universal Serial Bus (USB), Small Computer System Interface (SCSI), Peripheral Component Interconnect express (PCIe), ATA, Parallel ATA (PATA), Serial ATA (SATA), Serial Attached SCSI (SAS), etc. The host interface 4212 may perform a disk emulation function that enables the host 4100 to recognize the SSD 4200 as a Hard Disk Drive (HDD).

The ECC circuit 4213 may generate an error correction code using data transferred to the non-volatile memories (e.g., flash memories) 4201 to 420n. The error correction code may be stored at/in a spare area of a flash memory. The ECC circuit 4213 may detect an error of data read from the flash memories 4201 to 420n. If the detected error belongs to or is within the correction coverage, the ECC circuit 4213 may correct the detected error.

The CPU 4214 may analyze and process a signal SGL input from a host 4100 (refer to FIG. 14). The CPU 4214 may control the host 4100 or the flash memories 4201 to 420n via the host interface 4212 or the NVM interface 4211. The CPU 4214 may control the flash memories 4201 to 420n according to firmware for driving the SSD 4200.

In an example in which a unit map table includes a physical unit corresponding to a logical unit, the SSD 4200 in FIG. 14 may obtain a physical page (and/or a physical page number) corresponding to a logical page (and/or a logical page number) using a full block indicator 1243 (refer to FIG. 3), and may perform a read operation on a corresponding page.

Accordingly, it may be possible to perform a page mapping operation relatively simply using the full block indicator 1243 without loading mapping information from a meta area 1212 (refer to FIG. 3). Thus, the SSD 4200 may improve the read performance using the mapping manager.

Figure 16:
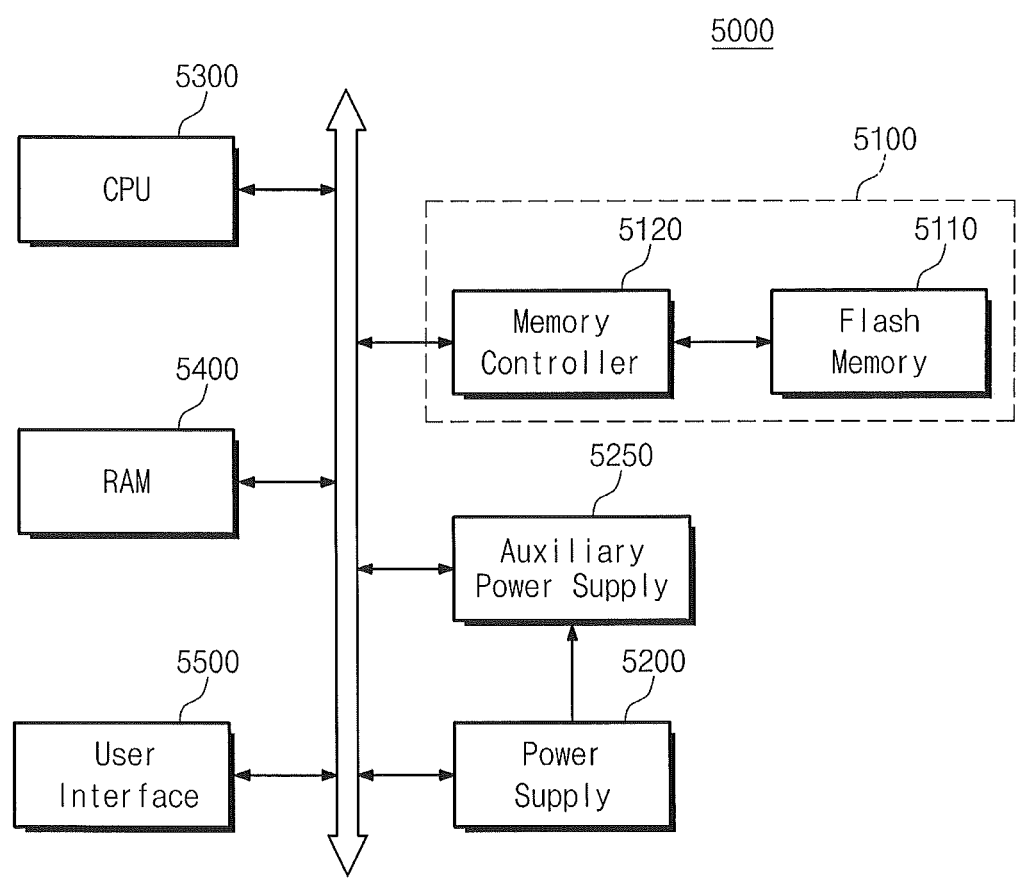

FIG. 16 is a block diagram schematically illustrating an electronic device including a user device according to various embodiments of the present inventive concepts. An electronic device 5000 may be a personal computer or a handheld electronic device such as a notebook computer, a cellular phone, a PDA, a camera, and the like.

Referring to FIG. 16, the electronic device 5000 may include a memory system 5100, a power supply device 5200, an auxiliary power supply 5250, a CPU 5300, a RAM 5400, and a user interface 5500. The memory system 5100 may include a flash memory 5110 and a memory controller 5210. The memory system 5100 may improve the read performance using the mapping manager described herein.

A user device according to various embodiments of the present inventive concepts can be applied to a flash memory having a two-dimensional structure, as well as a flash memory having a three-dimensional structure.

Figure 17:
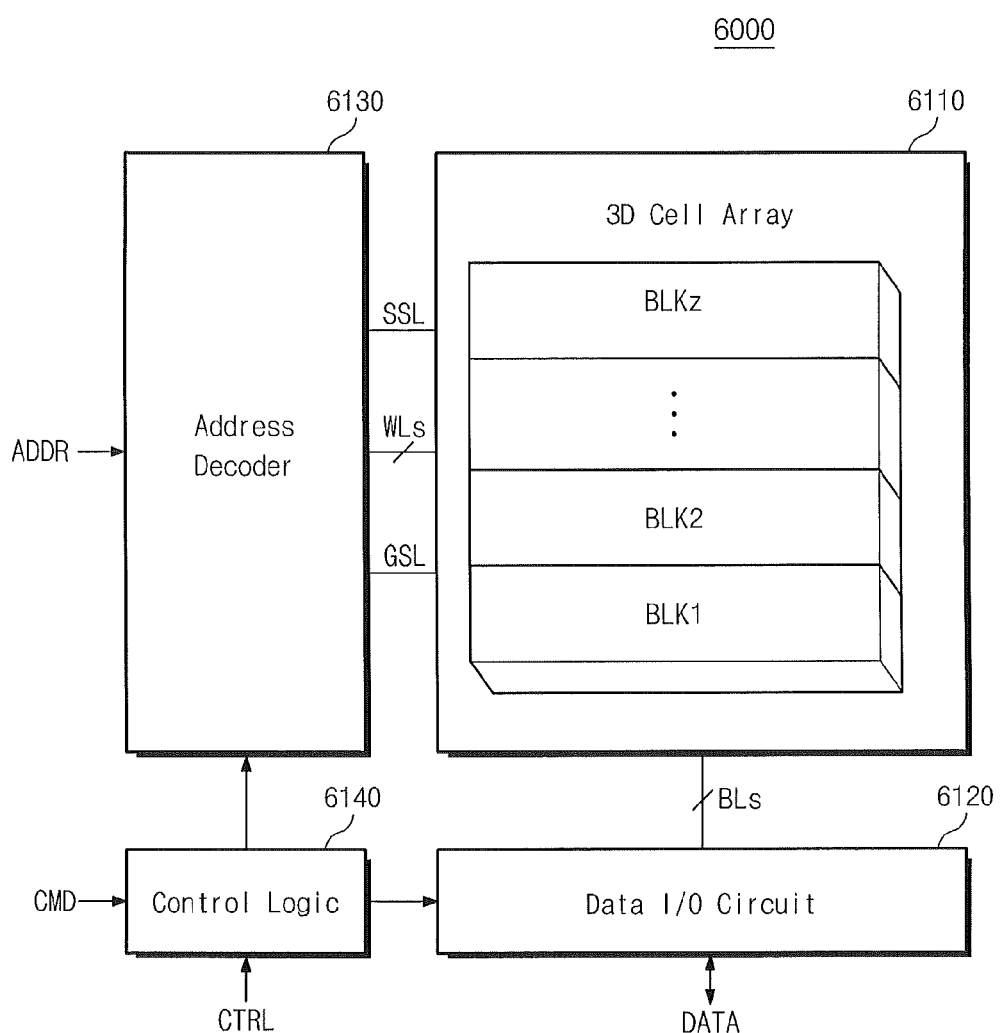
FIGS. 17 to 19 illustrate block diagrams of applications to be applied to a flash memory having a three-dimensional structure, according to various embodiments.

FIG. 17 is a block diagram schematically illustrating a flash memory according to various embodiments. Referring to FIG. 17, a flash memory 6000 may include a three-dimensional (3D) cell array 6110, a data input/output (I/O) circuit 6120, an address decoder 6130, and control logic 6140.

The 3D cell array 6110 may include a plurality of memory blocks BLK1 to BLKz, each of which is formed to have a three-dimensional structure (or a vertical structure). For a memory block having a two-dimensional (horizontal) structure, memory cells may be formed in a direction horizontal to a substrate. For a memory block having a three-dimensional structure, memory cells may be formed in a direction perpendicular to the substrate. Each memory block may be an erase unit of the flash memory 6000.

The data input/output circuit 6120 may be connected with the 3D cell array 6110 via a plurality of bit lines. The data input/output circuit 6120 may receive data from an external device or output data read from the 3D cell array 6110 to the external device. The address decoder 6130 may be connected with the 3D cell array 6110 via a plurality of word lines and selection lines GSL and SSL. The address decoder 6130 may select the word lines in response to an address ADDR.

The control logic 6140 may control programming, erasing, reading, etc. of the flash memory 6000. For example, with programming, the control logic 6140 may control the address decoder 6130 such that a program voltage is supplied to a selected word line, and may control the data input/output circuit 6120 such that data is programmed.

Figure 18:
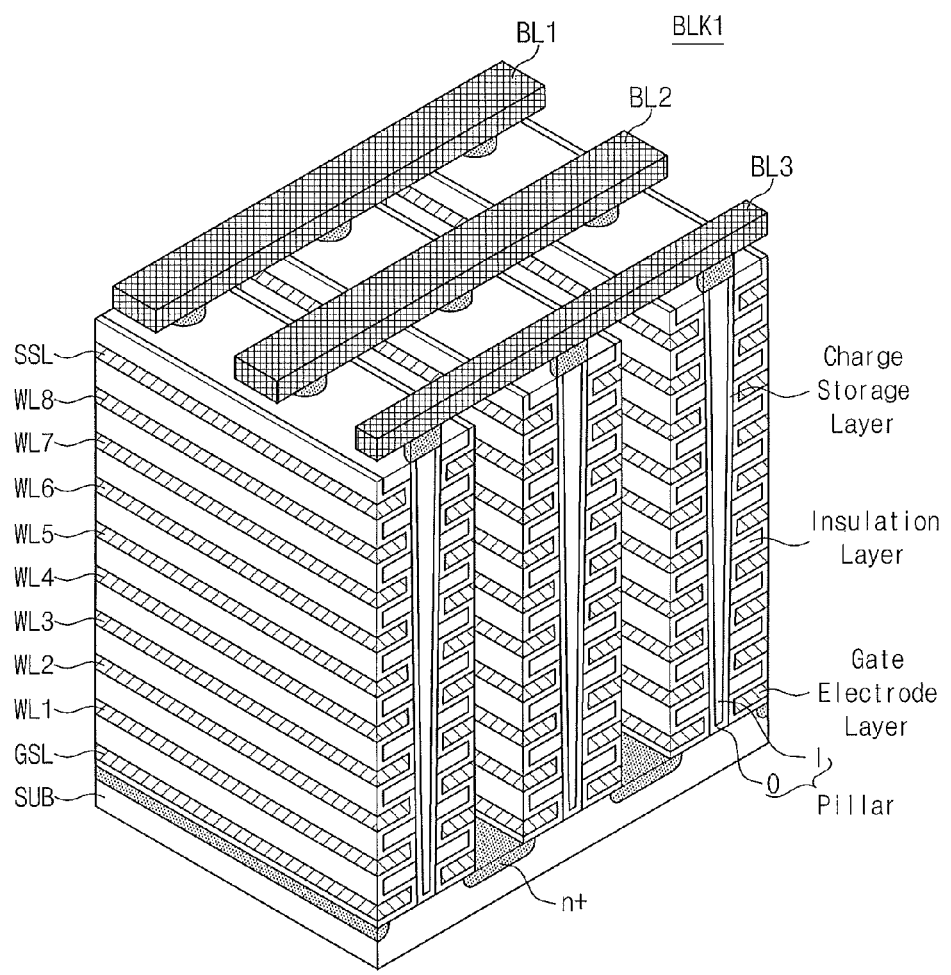

FIG. 18 is a perspective view schematically illustrating a 3D structure of a memory block illustrated in FIG. 17. Referring to FIG. 18, a memory block BLK1 may be formed in a direction perpendicular to a substrate SUB. An n+ doping region may be formed at the substrate SUB. A gate electrode layer and an insulation layer may be deposited on the substrate SUB in turn. A charge storage layer may be formed between the gate electrode layer and the insulation layer.

If the gate electrode layer and the insulation layer are patterned in a vertical direction, a V-shaped pillar may be formed. The pillar may be connected with the substrate SUB via the gate electrode layer and the insulation layer. An outer portion O of the pillar may be formed of a channel semiconductor, and an inner portion I thereof may be formed of an insulation material such as silicon oxide.

The gate electrode layer of the memory block BLK1 may be connected with a ground selection line GSL, a plurality of word lines WL1 to WL8, and a string selection line SSL. The pillar of the memory block BLK1 may be connected with a plurality of bit lines BL1 to BL3. In FIG. 18, an example is illustrated in which one memory block BLK1 has two selection lines SSL and GSL, eight word lines WL1 to WL8, and three bit lines BL1 to BL3. However, the disclosure is not limited thereto, and may thus include more or fewer selection lines, word lines and/or bit lines.

Figure 19:
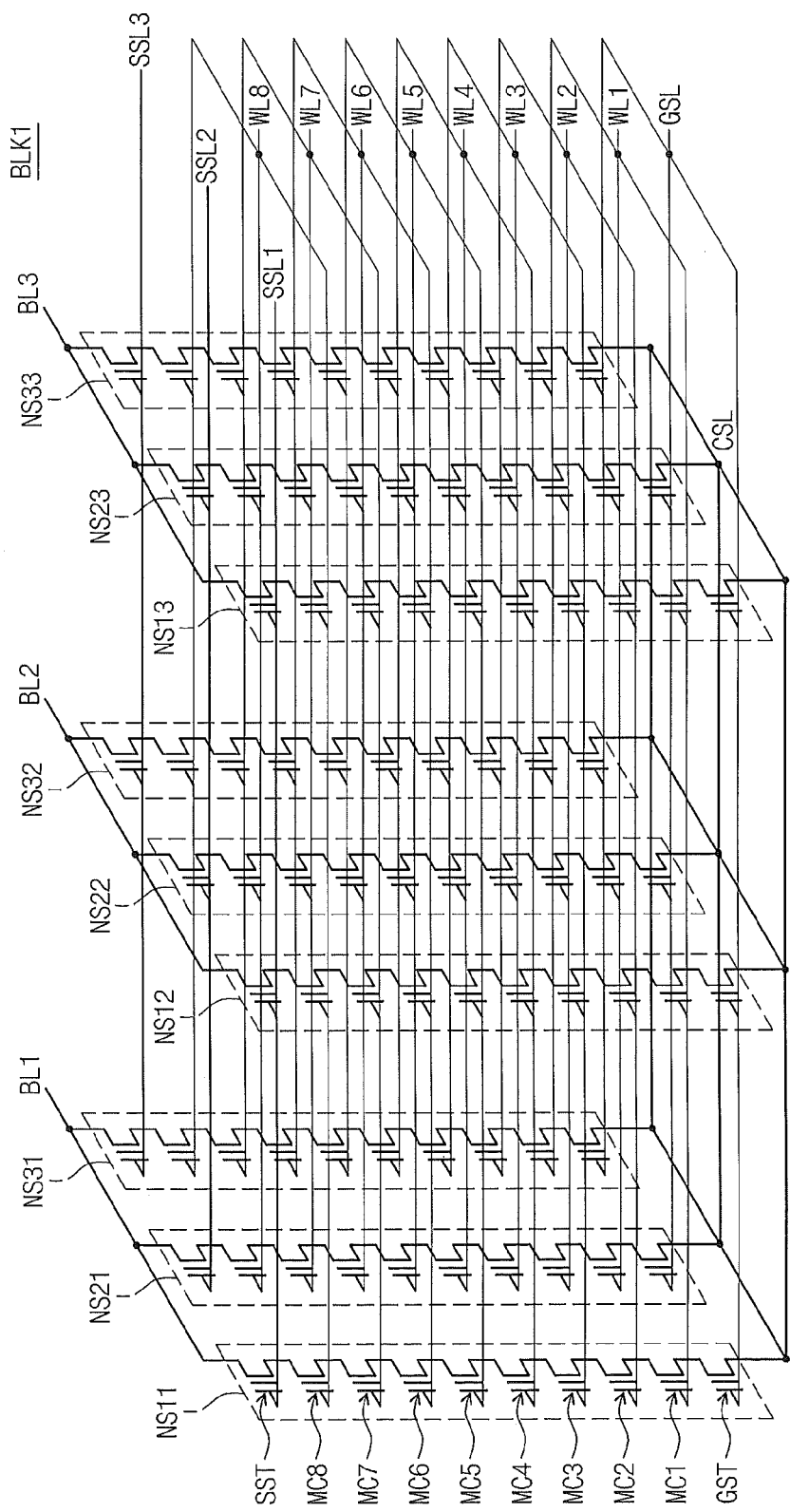

FIG. 19 is a circuit diagram schematically illustrating an equivalent circuit of a memory block illustrated in FIG. 18. Referring to FIG. 19, Not AND (NAND) strings NS11 to NS33 may be connected between bit lines BL1 to BL3 and a common source line CSL. Each NAND string (e.g., NS11) may include a string selection transistor SST, a plurality of memory cells MC1 to MC8, and a ground selection transistor GST.

The string selection transistors SST may be connected with string selection lines SSL1 to SSL3. The memory cells MC1 to MC8 may be connected with corresponding word lines WL1 to WL8, respectively. The ground selection transistors GST may be connected with ground selection line GSL. A string selection transistor SST may be connected with a bit line and a ground selection transistor GST may be connected with a common source line CSL.

Word lines (e.g., WL1) having the same height may be connected in common, and the string selection lines SSL1 to SSL3 may be separated from one another. At programming of memory cells (constituting a page) connected with a first word line WL1 and included in NAND strings NS11, NS12, and NS13, there may be selected a first word line WL1 and a first string selection line SSL1

A user device according to various embodiments may further include an application chipset, a camera image processor (CIS), a mobile DRAM, and the like.

A storage device according to various embodiments the present inventive concepts may be packed by various types of packages. For example, a flash memory and/or a controller may be packed by various types of packages PoP (Package on Package), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), and the like.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A storage device comprising:
a flash memory configured to store data; and
a controller configured to perform a read operation on a physical page of the flash memory in response to a read request on a logical page of the flash memory from a host,
wherein the controller includes a mapping manager configured to manage a plurality of logical blocks by a logical unit, the mapping manager including a unit map table including correlations between logical units and physical units corresponding to respective ones of the logical units, the mapping manager being further configured to change a mapping method according to whether the unit map table includes a physical unit corresponding to a logical unit including the logical page requested by the host, and
wherein the mapping manager further comprises:
a page map table including correlations between logical page numbers and physical page numbers; and
a full block indicator configured to manage the unit map table.

2. The storage device of claim 1, wherein when the unit map table includes the physical unit corresponding to the logical unit including the logical page requested by the host, the mapping manager obtains a physical page corresponding to the logical page requested by the host using the full block indicator.

3. The storage device of claim 2, wherein the logical unit including the logical page requested by the host and the physical unit corresponding to the logical unit including the logical page requested by the host have the same offset on a memory block or a page.

4. The storage device of claim 3, wherein a logical unit of the unit map table and the physical unit corresponding to that logical unit include pages having a sequential data pattern.

5. The storage device of claim 3, wherein a logical unit of the unit map table and the physical unit corresponding to that logical unit include pages having an erased data pattern.

6. The storage device of claim 1, wherein when the unit map table does not include the physical unit corresponding to the logical unit including the logical page requested by the host, the mapping manager is configured to use the page map table to obtain a physical page corresponding to the logical page requested by the host.

7. The storage device of claim 6, wherein the page map table is configured to have a correlation between the logical page requested by the host and the corresponding physical page loaded onto the page map table from a meta area of the flash memory.

8. The storage device of claim 1, wherein the controller comprises a local memory configured to drive the mapping manager.

9. The storage device of claim 8, wherein:
the mapping manager is configured to use the full block indicator to obtain a physical page corresponding to the logical page requested by the host when the unit map table includes the physical unit corresponding to the logical unit including the logical page requested by the host.

10. The storage device of claim 1, wherein the physical unit corresponding to the logical unit including the logical page requested by the host has the same size as the logical unit including the logical page requested by the host.

11. A user device comprising:
a host; and
a storage device configured to perform a read operation on a physical page of a flash memory of the storage device in response to a read request on a logical page of the flash memory of the storage device from the host,
wherein the storage device is configured to manage a plurality of logical blocks by a logical unit, includes a unit map table that includes correlations between logical units and physical units corresponding to respective ones of the logical units, and is configured to change a mapping method according to whether the unit map table includes a physical unit corresponding to a logical unit including the logical page requested by the host, and
wherein the storage device comprises:
a full block indicator configured to manage the unit map table; and
a page map table including correlations between logical page numbers and physical page numbers.

12. The user device of claim 11, wherein when the unit map table includes the physical unit corresponding to the logical unit including the logical page requested by the host, the storage device is configured to use the full block indicator to obtain a physical page corresponding to the logical page requested by the host.

13. The user device of claim 11, wherein when the unit map table does not include the physical unit corresponding to the logical unit including the logical page requested by the host, the storage device is configured to use the page map table to obtain a physical page corresponding to the logical page requested by the host.

14. The user device of claim 13, wherein the page map table is configured to have a correlation between the logical page requested by the host and the corresponding physical page loaded onto the page map table from a meta area of the flash memory of the storage device.

15. The user device of claim 11, wherein the physical unit corresponding to the logical unit including the logical page requested by the host has the same size as the logical unit including the logical page requested by the host, and
wherein the logical unit including the logical page requested by the host and the physical unit corresponding to the logical unit including the logical page requested by the host have the same offset on a memory block or a page.

16. An electronic device comprising:
a non-volatile memory comprising a data area and a meta area;
a controller configured to receive a read request for a logical page number of the data area of the non-volatile memory from a host;
a full block indicator comprising logical page numbers and corresponding physical page numbers; and
a mapping manager configured to determine whether the logical page number requested by the host is included among the logical page numbers in the full block indicator, to obtain a physical page number corresponding to the logical page number requested by the host in response to determining that the logical page number requested by the host is included among the logical page numbers in the full block indicator, and to load page number mapping information from the meta area of the non-volatile memory in response to determining that the logical page number requested by the host is not included among the logical page numbers in the full block indicator.

17. The electronic device of claim 16, wherein:
the mapping manager comprises a page map table comprising logical page numbers and corresponding physical page numbers; and
the mapping manager is configured to load page number mapping information from the meta area of the non-volatile memory by loading the page number mapping information from the meta area onto the page map table.

18. The electronic device of claim 16, wherein the mapping manager is configured to determine whether the logical page number requested by the host is included among the logical page numbers in the full block indicator by determining whether the full block indicator includes a physical unit number that corresponds to a logical unit number corresponding to the logical page number requested by the host.

19. The electronic device of claim 17, wherein:
the non-volatile memory comprises a flash memory;
the flash memory comprises the mapping manager; and
the mapping manager comprises the full block indicator and the page map table.

20. The electronic device of claim 17, wherein:
the non-volatile memory comprises a flash memory; and
the host comprises the mapping manager.

* * * * *